United States Patent [19]
Jeffers et al.

[11] 4,099,138
[45] Jul. 4, 1978

[54] CHEMICALLY FUELED LASER

[75] Inventors: William Q. Jeffers, Florissant; John Daniel Kelley, St. Louis; Charles E. Wiswall, Hazelwood, all of Mo.

[73] Assignee: McDonnell Douglas Corporation, St. Louis, Mo.

[21] Appl. No.: 648,273

[22] Filed: Jan. 12, 1976

Related U.S. Application Data

[63] Continuation of Ser. No. 473,695, May 28, 1974, abandoned.

[51] Int. Cl.$^2$ ................................................. H01S 3/00
[52] U.S. Cl. ........................... 331/94.5 P; 331/94.5 G
[58] Field of Search ....................... 331/94.5 P, 94.5 G

[56] References Cited
PUBLICATIONS

Smart et al. "$CS_2O_2$ Chemical Lasers", J. Applied Physics, vol. 43, pp. 1022–1032, Mar., 1972.

*Primary Examiner*—Edward S. Bauer
*Attorney, Agent, or Firm*—Gravely, Lieder & Woodruff

[57] ABSTRACT

This application relates to fuel for a chemical laser in which carbon monosulfide (CS) is reacted with oxygen atoms (O) to fuel a carbon monoxide (CO) chemical laser. The use of carbon monosulfide results in faster pumping of the laser, less heating of the medium, and a lessened need for oxygen atoms in the system.

2 Claims, 3 Drawing Figures

CHEMICALLY FUELED LASER

The Government has rights in this invention pursuant to Contract Number N00014-72-C-0458 awarded by the Department of the Navy.

This is a Continuation of application Ser. No. 473,695 filed May 28, 1974 and now abandoned.

BACKGROUND OF THE INVENTION

This invention relates to chemical lasers and more particularly to a continuous wave (cw) carbon monoxide laser fueled by carbon monosulfide.

A review of the state of the art of chemical lasers is contained in an article by Arthur N. Chester entitled 'Chemical Lasers: A Survey of Current Research' published in Proceedings of the IEEE, Vol. 61, No. 4, April 1973. Patent No. 3,760,293 describes a continuous wave free burning flame laser using carbon disulfide and oxygen as reactants.

In a conventional carbon disulfide — oxygen laser the oxygen molecule is dissociated into reactive oxygen atoms, and the carbon disulfide reacts with an oxygen atom to produce carbon monosulfide and sulfur monoxide. This reaction at temperatures of less than 500° K. is represented as follows:

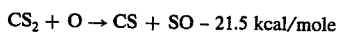
$$CS_2 + O \rightarrow CS + SO - 21.5 \text{ kcal/mole}$$

The carbon monosulfide reacts with an oxygen atom to produce carbon monoxide laser emission as follows:

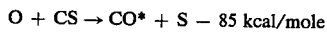
$$O + CS \rightarrow CO^* + S - 85 \text{ kcal/mole}$$

It is reported that about 75% of the exothermicity enters vibration of CO.

A final reaction in this system results in regeneration of oxygen atoms as follows:

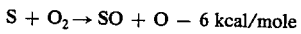
$$S + O_2 \rightarrow SO + O - 6 \text{ kcal/mole}$$

The reaction $O + CS_2 \rightarrow CS + SO$ acts primarily as a rate-limiting step to the pumping reaction in a CO chemical laser, and its exothermicity is detrimental to the medium because of the temperature dependence of CO optical gain coefficients. An additional and more subtle effect of increased temperature is to speed V—V relaxation rates in CO—CO collisions, and thus hasten V—V equilibration of the CO vibrational distribution, which also leads to decreased optical gain coefficients.

Of the 85 kcal/mole produced in the $O + CS \rightarrow CO^* + S$ reaction, only some 21.2 kcal/mole is supplied to translational and rotational modes. This is a relatively small amount compared to the total reaction exothermicity.

Carbon monosulfide is not a radical species in the usual sense, and it exhibits long lifetimes at low pressures. Therefore, it is a feasible fuel for use directly in a CO chemical laser. Elimination of the reaction between carbon disulfide and oxygen will increase the rate of the pumping reaction by about a factor of 4, and the heating of the laser medium will be reduced to about a factor of 2.

The apparatus used in this invention is described in an article by William Q. Jeffers (a co-inventor of this application) in Appl. Phys. Letters 21, 267 (1972).

The apparatus is shown schematically in the attached drawings wherein

Carbon monosulfide can be produced in electrical discharges and by thermal dissociation of $CS_2$. We have found that carbon monosulfide has a low loss rate, i.e., a low rate of recombination to $CS_2$, so that it is suitable for use as a fuel in chemical lasers.

The data of this application is based on a fuel containing a mixture of carbon monosulfide and carbon disulfide in which the mole ratio of $CS/CS_2$ is at least about 0.3. This invention is equally applicable to fuels with higher $CS/CS_2$ ratios, including pure CS. However, at the present state of the art it is impractical to make completely pure CS for use as a laser fuel.

Figure 1:
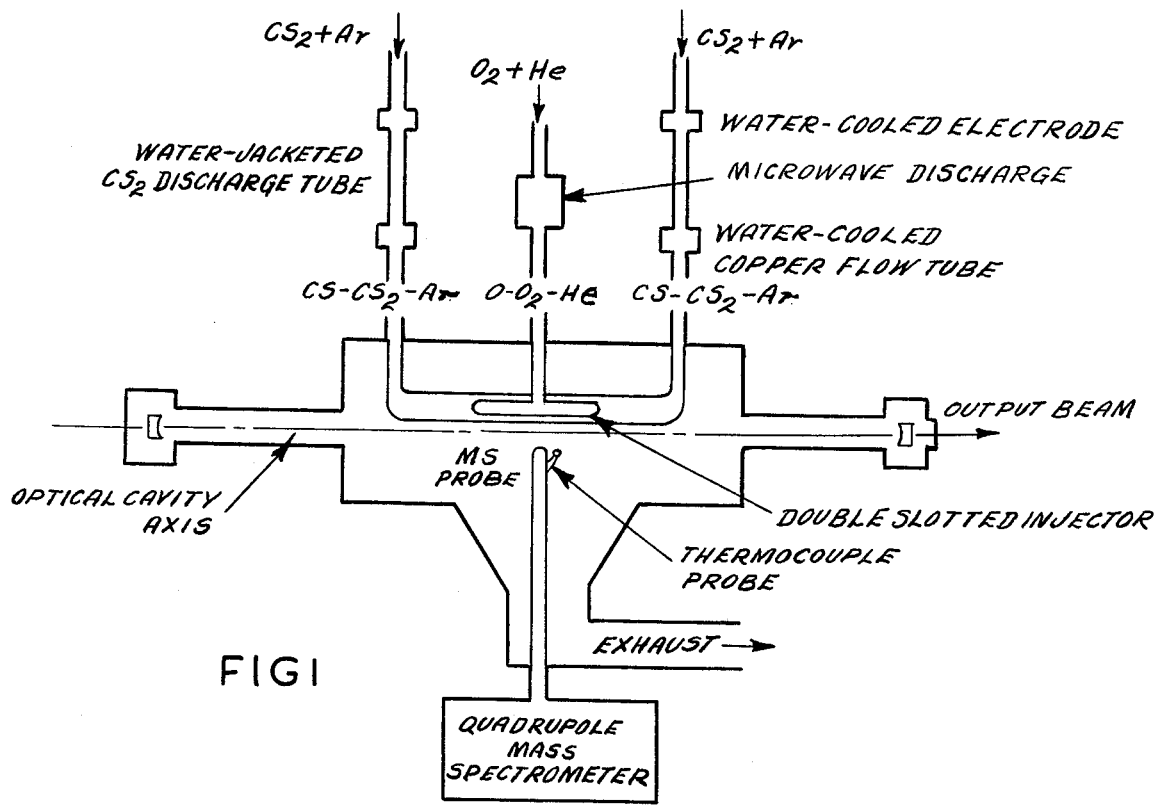
FIG. 1 is a schematic diagram of the transverse flow CO chemical laser apparatus.
Figure 2:
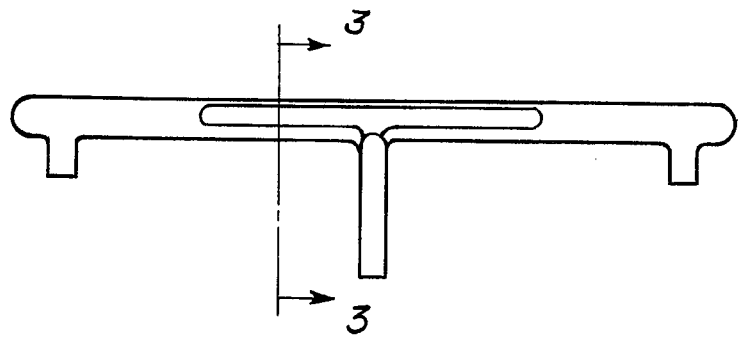
FIG. 2 is a detailed drawing of the glass double-slotted reactant injector.
Figure 3:
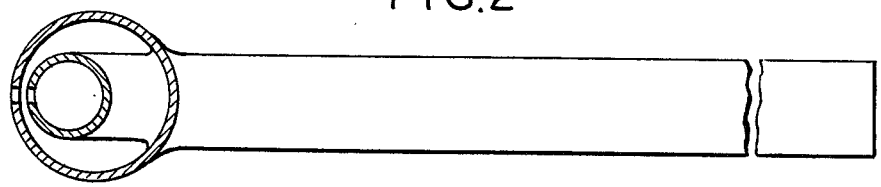
FIG. 3 is a fragmentary sectional view taken along line A—A of FIG. 2

In the apparatus shown in the drawings, the $O—O_2$-He flow is supplied by a microwave discharge feeding the inner slotted injector 10 of FIGS. 2-3. The fuel ($CS_2$-CS-Ar) is injected into the primary flow through the outer slotted glass injector 11. The optical cavity consists of a gold-coated mirror with a 10-m radius of curvature opposite a 2% transmitting flat, and is positioned 1.50 cm downstream from the fuel injection position. A gas sampling probe using a 0.008-cm-diam sampling orifice is placed 1.00 cm downstream from the optical cavity axis. The sampling probe is connected to a quadrupole mass spectrometer of known sensitivity to CS.

DC glow discharges are used to provide CS flow to the transverse fuel injectors. These discharges are able to supply CS to $CS_2$ molar ratios of about 0.3 or greater by dissociation of $CS_2$ dilute in Ar.

The Ar addition to $CS_2$ discharges stabilizes the discharge and the CS production rate even in the pressure of solid wall deposits of carbon and sulfur which otherwise may inhibit CS production. The dc dissociators use water-jacketed thin wall quartz tubes of 24 mm o.d. by 30 cm length with coaxial metal electrodes at each end. Various ballast resistors from 333 $\Omega$ to 2$k\Omega$ were used with discharge currents of 2.5 to 0.5 A. The best production of CS is obtained with ballast resistors of 1.0 $k\Omega$ and a discharge current of 1.0 to 1.2 A. The gas flows through the discharge were 0.07 to 0.15 mmole/sec. of $CS_2$ and variable amounts of argon. The supply voltage across ballast plus discharge tube was 1500 V, and the discharge tube pressure can be varied from about 5 to 30 Torr with small changes in discharge current and supply voltage.

Typical experimental conditions for laser operation are listed in Table I.

Table I

| CS-Fueled laser: Experimental Conditions | | |
|---|---|---|
| $CS_2$ dissociator input gas flows: | $CS_2$ | 0.10 mmole/sec. |
|  | Ar | 0.90 mmole/sec. |
| CS and $CS_2$ flow delivered to optical cavity: | $CS^a$ | 0.025 mmole/sec. |
|  | $CS_2$ | 0.025 mmole/sec. |
| Dissociator current: | 1.1A | each discharge |
| Microwave discharge input gas flows: | He | 21.5 mmole/sec. |
|  | $O_2$ | Variable |
| Cavity pressure: | 6.2 Torr | |
| Optical cavity distance downstream from injector: 1.5 cm | | |

[a]The MS sensitivity was assumed to be a factor of 2.0 higher at 44 (CS) as compared to 76($CS_2$).

The mass spectrometer (MS) sampling probe was positioned 3.0 cm downstream of the injector for all of the measurements of CS and $CS_2$. With no $O_2$ flow through the inner manifold, the experimental conditions in the laser cavity are summarized in Table I. The sensitivity of a similar mass spectrometer to CS was measured by producing pure CS in a bulb and measuring the $m/e = 44$ (CS) signal level and CS pressure. The same measurement then was done with $CS_2$, and a comparison of the results indicated a factor of 2.0 greater sensitivity to CS relative to $CS_2$. Thus with equal amounts of CS and $CS_2$ in the laser cavity the $m/e = 44$ signal was about 2.2 times larger than the $m/e = 76$ ($CS_2$) signal. The additional 0.2 signal level at $m/e = 44$ results from the cracking pattern of pure $CS_2$ which produced relative peaks at $m/e = 44$ and 76 of 0.2 and 1.0, respectively.

Carbon monosulfide may also be generated by dissociation of $CS_2$ in a vitreous carbon thermal cell at temperatures up to 1900 K and detected with a mass spectrometer. Using a 30% $CS_2$–70% Ar mixture, the total pressure was varied between 7.2 and 25 mTorr with $CS_2$ partial pressures between 2.0 and 12 mTorr. At 1900 K the mole fraction ratio of CS to $CS_2$ was observed to be approximately 17. Although the value of this ratio is valid only at the low pressures listed, these results show that CS can be produced by thermal generation.

A series of laser output power measurements were made with CS + $CS_2$ and $CS_2$ fuel flows. In each CS + $CS_2$ run the CS/$CS_2$ ratio was very close to 1.0. The $O_2$ flow was readjusted to give maximum output power on each run; the CS + $CS_2$ flow shown in Table I required less $O_2$ flow than with the pure $CS_2$ flow shown in Table I. For maximum power with CS + $CS_2$ flow, the required $O_2$ flow was such that the white reaction region extended only ~1 cm downstream of the injector. The mole flow rate of $CS_2$ into the dissociator was 0.10 mmole/sec. compared with an output mole flow rate of 0.05 mmole/sec. of CS + $CS_2$ at CS/$CS_2$ = 1.0. The results are listed in Table II.

Table II

| | Laser Output Power Measurements[a] | | |
|---|---|---|---|
| Experiment[b] | $CS_2$ Flow Rate (mmole/sec) | CS Flow Rate (mmole/sec) | P out (W) |
| 1 | 0.07 | — | 0.48 |
| 1A | 0.02 | 0.02 | 1.20 |
| 2 | 0.10 | — | 0.5 |
| 2A | 0.025 | 0.025 | 1.85 |
| 3 | 0.025 | 0.025 | 1.90 |
| 3A | 0.02 | — | 0.17 |

[a]Experimental conditions (other than fuel flows) are listed in Table I.
[b]Experimentals 1 and 1A, and 2 and 2A, differ only in that the $CS_2$ dissociator was turned on for the second measurement 1A and 2A of output power. The $CS_2$ flow in 3A was reduced to produce the same 76 peak height as was detected in the combined CS + $CS_2$ flow of experiment 3.

The average output power normalized to $CS_2$ flow rate from experiments 1, 2, and 3A in Table II is 6.8 W/mmole/sec., with values from 5.0 to 8.5. Using the average value of 6.8, the contribution of CS to the output power can be calculated assuming the total output to be due to the two fuels reacting independently with the O-atom stream. The average output power normalized to fuel flow rate for CS from experiments 1A, 2A, and 3 is 63 W/mmole/sec., with values ranging from 53 to 69. The range of values for these normalized powers simply reflects the difficulty of accurate repeatability of laser cavity tuning, reactant flow conditions, and mass spectrometer signal levels. Any given measurement should not be taken to be more accurate than a factor of 2. The power improvement factor of CS over $CS_2$ fuel for the present experiments is 9.2. Consequently, our conclusion is that a CS-fueled CO laser exhibits a large increase in output power.

What is claimed is:

1. A method of producing a CO chemical laser which exhibits an increased rate of pumping reaction and reduced heating of the laser medium as compared with the use of $CS_2$ alone as fuel at the same molar flow rate, comprising the steps of:
    A. producing a fuel which is a mixture of CS and $CS_2$ by dissociating $CS_2$ and feeding said fuel to a reaction chamber, said fuel having a CS/$CS_2$ ratio of at least 0.3,
    B. simultaneously providing oxygen atoms in said reaction chamber,
    C. reacting said fuel and said oxygen atoms to produce carbon monoxide in an active laser state,
    D. and producing a laser beam from said carbon monoxide, said laser having a power output higher than the twofold increase expected from using CS rather than $CS_2$ as the fuel source at the same molar flow rate.

2. A method of producing a CO chemical laser comprising the steps of
    A. dissociating $CS_2$ to form a reactant which is a mixture of CS and $CS_2$ in which the ratio of CS/$CS_2$ is greater than 0.3 and feeding said reactant to a reaction chamber,
    B. simultaneously providing oxygen atoms in said reaction chamber,
    C. reacting said reactant and said oxygen atoms to produce vibrationally excited carbon monoxide in an active laser state,
    D. and producing a laser beam from said vibrationally excited carbon monoxide, said laser having a power output at least about 5 times greater than that resulting from using $CS_2$ as the fuel source at the same molar flow rate.

* * * * *